US00RE44157E

(19) United States
(12) Reissued Patent
Komara et al.

(10) Patent Number: US RE44,157 E
(45) Date of Reissued Patent: Apr. 16, 2013

(54) METHOD AND APPARATUS FOR EQUALIZATION IN TRANSMIT AND RECEIVE LEVELS IN A BROADBAND TRANSCEIVER SYSTEM

(75) Inventors: Michael A. Komara, Satellite Beach, FL (US); Thomas R. Schmutz, Sarosota, FL (US); John R. Noll, Satellite Beach, FL (US)

(73) Assignee: Treble Investments Limited Liability Company, Wilmington, DE (US)

(21) Appl. No.: 12/122,251

(22) Filed: May 16, 2008 (Under 37 CFR 1.47)

Related U.S. Patent Documents

Reissue of:
(64) Patent No.: 7,047,042
Issued: May 16, 2006
Appl. No.: 09/755,497
Filed: Jan. 5, 2001

U.S. Applications:
(62) Division of application No. 13/539,052, filed on Jun. 29, 2012.

(60) Provisional application No. 60/175,351, filed on Jan. 10, 2000.

(51) Int. Cl.
*H04B 1/04* (2006.01)

(52) U.S. Cl.
USPC ..... 455/561; 455/114.3; 455/501; 455/522

(58) Field of Classification Search ..... 455/114.3
See application file for complete search history.

(56) References Cited

U.S. PATENT DOCUMENTS

| | | | |
|---|---|---|---|
| 3,675,138 | A | 7/1972 | Standing |
| 4,803,739 | A | 2/1989 | Daikoku et al. |
| 5,161,044 | A | 11/1992 | Nazarathy et al. |
| 5,251,328 | A | 10/1993 | Shaw |
| 5,436,973 | A | 7/1995 | Amoroso |
| 5,493,695 | A | 2/1996 | Aitkenhead et al. |
| 5,574,990 | A | 11/1996 | Flanagan |
| 5,740,520 | A | 4/1998 | Cyze et al. |
| 5,970,410 | A | 10/1999 | Carney et al. |
| 6,223,056 | B1 | 4/2001 | Appel |
| 6,266,517 | B1 | 7/2001 | Fitzpatrick et al. |
| 6,275,685 | B1 | 8/2001 | Wessel et al. |
| 6,449,466 | B1 | 9/2002 | Jin et al. |
| 6,597,925 | B1 | 7/2003 | Garcia et al. |

*Primary Examiner* — Matthew Anderson
*Assistant Examiner* — David Bilodeau
(74) *Attorney, Agent, or Firm* — Brundidge & Stanger, P.C.

(57) ABSTRACT

A method (100) for amplitude equalization in transmit and receive levels in a base station wideband transceiver (50) includes the step of assigning (102) a plurality of transmit and receive carrier frequencies to the base station wideband transceiver and the step of flattening (104) the power in the plurality of transmit and receive carrier frequencies in the plurality of base wideband transceivers using software amplitude pre-distortion.

9 Claims, 2 Drawing Sheets

AMENDED

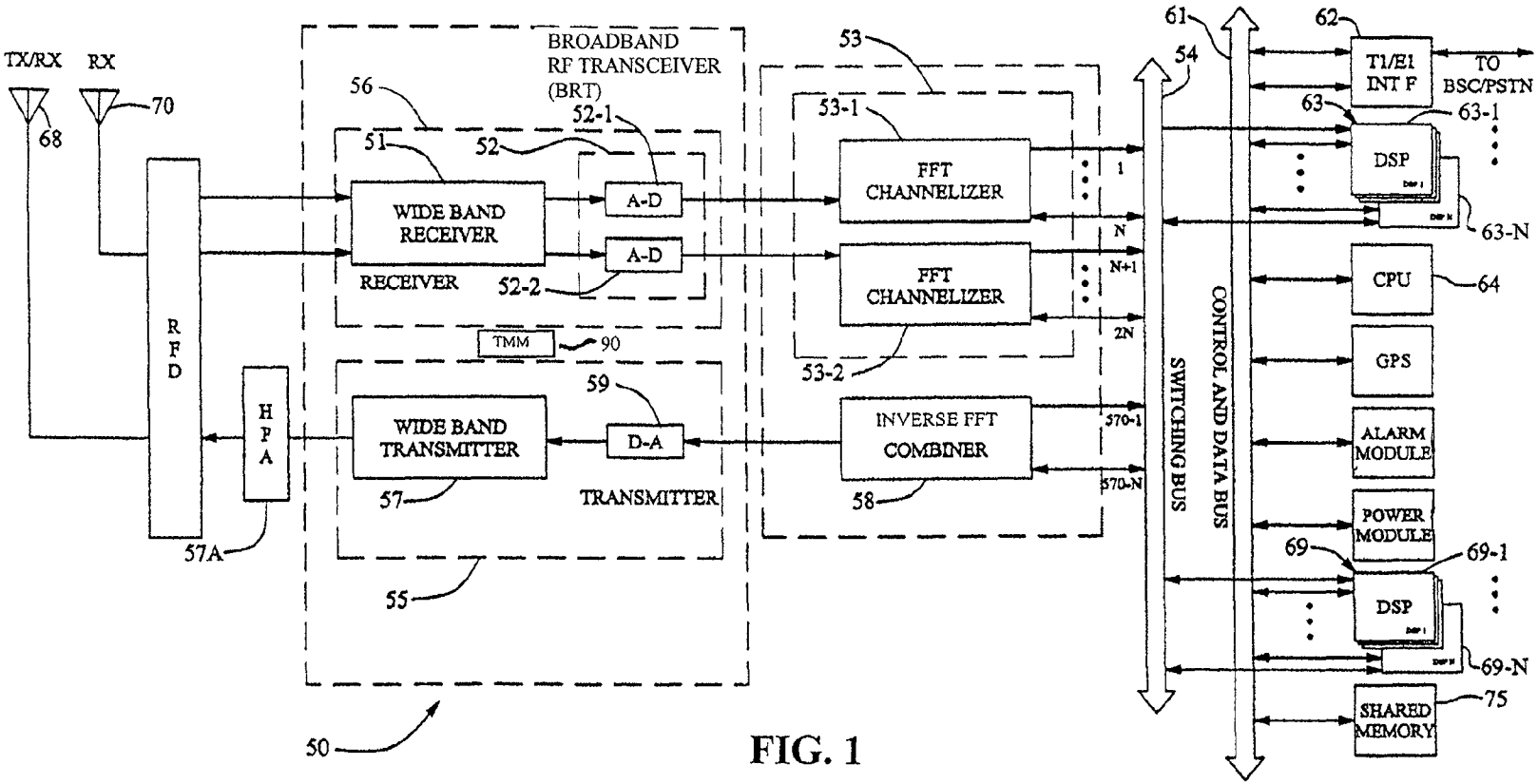
FIG. 1
AMENDED

METHOD AND APPARATUS FOR EQUALIZATION IN TRANSMIT AND RECEIVE LEVELS IN A BROADBAND TRANSCEIVER SYSTEM

Matter enclosed in heavy brackets [ ] appears in the original patent but forms no part of this reissue specification; matter printed in italics indicates the additions made by reissue.

CROSS REFERENCE TO RELATED APPLICATIONS

[This application claims the benefit of U.S. Provisional Application 60/175,351 entitled, "EQUALIZATION IN TRANSMIT AND RECEIVE LEVELS IN A BROADBAND TRANSCEIVER SYSTEM," filed Jan. 10, 2000, the entirety of which is incorporated herein by reference.] *Notice: More than one reissue application has been filed for the reissue of U.S. Pat. No. 7,047,042. The present application is a divisional reissue application of reissue application Ser. No. 13/539,052, filed Jun. 29, 2012 and is a reissue application of U.S. Pat. No. 7,047,042, which claims the benefit of U.S. Provisional Application 60/175,351 entitled "EQUALIZATION IN TRANSMIT AND RECEIVE LEVELS IN A BROADBAND TRANSCEIVER SYSTEM," filed Jan. 10, 2000, the entirety of which is incorporated by reference.*

BACKGROUND OF THE INVENTION

1. Field of the Invention

This invention relates to wireless communication systems and in particular to a method and apparatus for improved accuracy in equalizing transmit and receive power levels in a base station transceiver to reduce distortion effects experienced on multiple receive and transmit channels.

2. Description of Relevant Art

The ever increasing need for wireless communication services such as Cellular Mobile Telephone (CMT), Digital Cellular Network (DCN), Personal Communication Services (PCS) and the like, typically require the operators of such systems to serve an increasing number of users in a given service area. As a result, certain types of base station equipment, including high capacity broadband transceiver systems (BTS), have been developed which are intended to service a relatively large number of active mobile stations in each cell.

In a broadband transceiver system (BTS), such as the current AdaptaCell BTS produced by AirNet Communications Corporation of Melbourne, Fla., multiple RF channels are transmitted and received concurrently. The frequency response, or gain, for each of these multiple RF channels received by the BTS differ as a result of system imperfections, such as passband ripple or filter roll-off, caused by the components of an RF transceiver in the BTS. The gain difference between these RF channels can be as large as plus or minus 3 dB. This is not a problem for BTS systems employing single channel radio transmitters and receivers rather than broadband transceivers, because single channel radios allow for the gain of each RF channel transmitted and received by the BTS to be set individually, rather than a single gain being added universally across all RF channels in the BTS.

It is desirable to have the gain be equivalent from RF channel to RF channel, because the GSM cellular communications protocol, among others, requires in its specifications that the receive side of a given BTS calculate a specific receive signal strength level with only plus or minus 2 dB of variation. When there is a large amount of variation in the receive signal of an RF carrier, it is difficult to determine the Receive Signal Strength Indication (RSSI) of a mobile station transmitting on the RF channel to the BTS. Without knowledge of the RSSI, it is difficult for the BTS to maintain uplink power control of the mobile station. A loss in uplink power control can result in the loss of signals transmitted by the mobile, unnecessary gain control by the BTS, and a premature expenditure of mobile battery power. In addition to maintaining receive power levels, there are requirements for the BTS to maintain a specific transmit power level across the RF channels of the transceiver as well. The transmit power level must also be maintained in order to prevent the expansion or shrinking of the cell size of the BTS, and for efficiency in the use of transmit power.

The traditional solution to this problem of non-uniform frequency response across RF channels is the use of multiple narrowband single carrier radios to cover the spectrum of RF channels received and transmitted by the BTS, setting the gain on each radio individually for the respective RF channel in a manner in which all RF channels have a uniform frequency response. Another solution that has been used in broadband systems to normalize this frequency response across RF channels has been to take a sampling of average roll-off and ripple values among a cross-section of transceivers. These average roll-off and ripple values were then used to set up a static power table across the transmission range. The static power table did not change for individual transceivers, and was used to artificially flatten the transmit and receive power levels for every transceiver in a BTS on the basis of the average filter roll-off and passband ripple values contained therein. Neither of these solutions provide optimal use of a broadband transceiver having uniformly flat (or normalized) transmit and receive power frequency responses in a given BTS. Thus, a need exists for a base transceiver system that discretely normalizes on every base transceiver within the BTS the frequency response on a channel-by-channel basis.

SUMMARY OF THE INVENTION

In a first aspect of the present invention, a method for equalization in transmit and receive levels within a base station wideband transceiver is disclosed. The base station wideband transceiver preferably operates in a wireless cellular communications system having a plurality of base station wideband transceivers that communicate with mobile subscribers. Preferably, the method comprises the step of assigning a plurality of transmit and receive carrier frequencies to the base station wideband transceiver and the step of flattening the power in the plurality of transmit and receive carrier frequencies in the base station wideband transceiver using software amplitude pre-distortion.

In a second aspect of the present invention, a broadband radio frequency base station transceiver capable of receiving and transmitting simultaneously on multiple frequencies comprises a receiver coupled to an plurality of analog-to-digital converters and a transmitter coupled to a digital-to-analog converter. The base station transceiver preferably further comprises at least one digital signal processor programmed to discretely flatten the power in each of the plurality of transmit and receive carrier frequencies using software amplitude pre-distortion.

In a final aspect of the present invention, a wireless cellular communications system with improved equalization in transmit and receive levels, comprises a plurality of wideband transceivers communicating with mobile subscribers, wherein a plurality of transmit and receive carrier frequencies are assigned to the plurality of wideband transceivers. Each of the wideband transceivers comprises a receiver coupled to an plurality of analog-to-digital converters, wherein the analog-to-digital converters provide a plurality of digitized signals to a corresponding plurality of digital channelizers, and a transmitter coupled to a digital-to-analog converter, wherein the digital-to-analog converter receives an analog signal from a multi-channel digital combiner. The wireless cellular communications system further comprises a first digital signal processor programmed to discretely flatten the power in each of the plurality of receive carrier frequencies using software amplitude pre-distortion and a second digital signal processor programmed to discretely flatten the power in each of the plurality of transmit carrier frequencies using software amplitude pre-distortion.

BRIEF DESCRIPTION OF THE DRAWINGS

Features and advantages of the present invention will become apparent to those skilled in the art from the following description with reference to the drawings, in which:

FIG. 1 is a block diagram of an exemplary base transceiver station in accordance with the present invention.

DETAILED DESCRIPTION OF PREFERRED EMBODIMENTS

Figure 2:
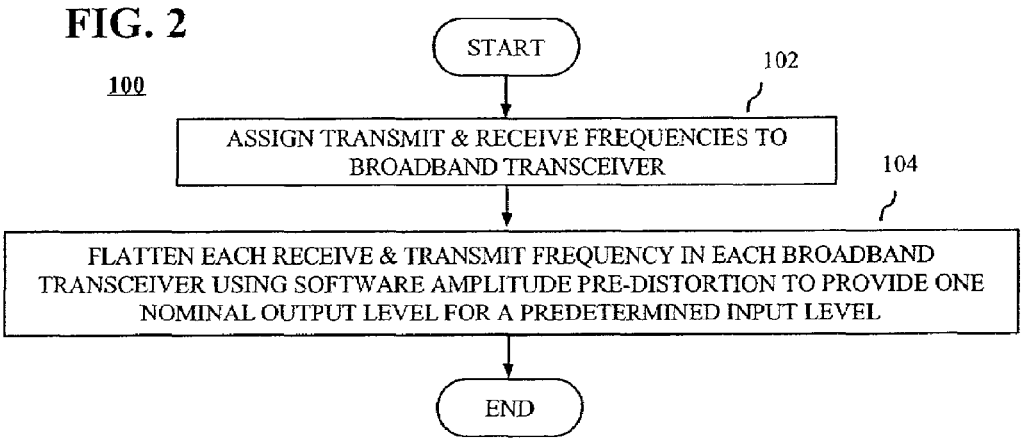
FIG. 2 is a flow chart illustrating a method for equalization in accordance with the present invention.

Referring to FIG. 1, a [broadband BTS] *base station wideband transceiver* 50 is illustrated, which comprises a receiver section 56 and a transmitter section 55. It will be readily appreciated by those skilled in the art that the particular transceiver architecture shown is not critical. Accordingly, the invention disclosed herein is not intended to be so limited. Receiver section 56 preferably includes antennas 68, 70 and a wideband receiver 51 capable of receiving a plurality of radio frequency carrier channels. Signals from the received channels can include new power requests, power adjustment requests, and traffic channel data from mobile users [19]. The term "wideband," as used herein, is not limited to any particular spectral range, and it should be understood to imply a spectral coverage of multiple frequency channels within the communication range over which a wireless communication system may operate (e.g. 5 or 12 MHz). Narrowband, on the other hand, implies a much smaller portion of the spectrum, for example, the width of an individual channel (e.g. 30 or 200 kHz).

The output of the wideband receiver 51 is downconverted into a multi-channel baseband signal that preferably contains the contents of all of the voice/data carrier frequency channels currently operative in the communication system or network of interest. This multi-channel baseband signal is preferably coupled to high speed A-D converters 52-1 and 52-2 operating in parallel for diversity receive capability. Where no diversity capability is required, a single A-D 52-1 could be utilized. Additionally, more than one parallel leg may be required for sectorized applications. Hence, it should readily be appreciated by one skilled in the art that the presence of a second parallel processing leg is not intended to be a limitation on the instant invention. The dynamic range and sampling rate capabilities of the A-D converter are sufficiently high (e.g. the sampling rate may be on the order of 25 Mega-samples per second (Msps)) to enable downstream digital signal processing (DSP) components, including Discrete Fourier Transform (DFT) or Fast Fourier Transform (FFT) channelizers 53-1 and 53-2, to process and output each of the active channels received by receiver 56.

The channelized outputs from the A-D converters are further processed to extract the individual channel components for each of the parallel streams. FFT channelizers 53-1 and 53-2 are preferably used to extract respective narrowband carrier frequency channel signals from the composite digitized multi-channel signals. These narrowband signals are representative of the contents of each of the respective individual carrier frequency communication channels received by the wideband receiver 51. The respective carrier frequency channel signals are coupled via N output links through a common *control and* data bus 61 to respective digital signal processing receiver units 63-1 . . . 63-N, each of which demodulates the received signal and performs any associated error correction processing embedded in the modulated signal. In the case where the received signals are destined for the *public switched telephone network* (PSTN), these demodulated signals derived from the digital signal processing receiver units 63 can be sent via a common shared *switching* bus 54 to a telephony carrier interface, for example, T1 carrier digital interface 62, of an attendant telephony network (not shown).

The transmitter section 55 includes a second plurality of digital signal processing units, specifically, transmitter digital signal processing units 69-1 . . . 69-N, that are coupled to receive from the telephony network respective ones of a plurality of channels containing digital voice/data communication signals to be transmitted over respectively different individual radio frequency carrier channels of the multichannel network. Transmitter digital signal processing units 69 modulate and perform pre-transmission error correction processing on respective incoming communication signals, and supply processed radio frequency carrier channel signals over the common bus 54 to respective input ports of an inverse FFT-based multi-channel digital combiner unit 58. The combiner 58 outputs a composite multi-channel digital signal. This composite signal is representative of the contents of a wideband signal which contains the respective narrowband carrier frequency channel signals output from the *transmitter* digital signal processing [transmitter] units 69. A composite signal generated from the output of the multi-channel combiner unit 58 is then processed by the digital-to-analog (D-A) converter 59. The analog output of D-A converter 59 is coupled to a wideband (multi-carrier) transmitter unit 57, which can include or have a separate multi-carrier high power amplifier (HPA) 57A. The transmitter unit 57 transmits a wideband (multi-carrier) communication channel signal defined by the composite signal output of the inverse fast Fourier transform-based digital combiner unit 58. The output of the HPA 57A is then coupled to antenna 68 for transmission.

A central processing unit (CPU) controller 64 is provided for coordinating and controlling the operation of *the* BTS [50]. For example, the CPU 64 can include a control processing unit, memory, and suitable programming for responding to transmit power control requests received from mobile transceiver units. CPU 64 can preferably selectively control transmit power levels for each TDMA communication channel on a timeslot-by-timeslot basis. The CPU 64 may be a microprocessor, DSP processor, or micro controller having firmware, software, or any combination thereof.

DSPs 63 can extract encoded information from each of the narrowband carrier frequency channel signals. Information for each of these channels can be stored in a memory such as shared memory 75 through the common control and data bus 61. The memory could also be flash memory within the DSP processors for example. CPU 64, under firmware and/or software control, can then access the shared memory 75 through bus 61. After the information for each channel in the received signal is processed and separated, DSPs 63 can store the control channel data in the shared memory 75. CPU 64 can then access shared memory 75 to retrieve the control channel data. CPU 64, under software and/or firmware control, can then use this data, for example, as an input to a control algorithm. The output from the algorithm can be stored in shared memory 75 for later use.

The invention described uses a GSM air-interface. However, this invention could also apply to other TDMA structures such as IS-136 and IS-54, CDMA, or any other wireless protocol.

It should be understood that the examples and embodiments described herein are for illustrative purposes only and that various modifications or changes in light thereof will be suggested to persons skilled in the art and are to be included within the spirit and purview of this application. The invention can take other specific forms without departing from the spirit or essential attributes thereof for an indication of the scope of the invention.

Referring to FIG. 2, a method 100 for equalization of transmit and receive levels in a base station wideband transceiver is shown. At step 102, transmit and receive frequencies are assigned to the broadband transceiver. Ideally, the transmit and receive frequencies are generally flat across all usable RF carriers (or Absolute Radio Frequency Channel Numbers (ARFCNs)) in accordance with the present invention. As shown in step 104, flattening of the transmit and receive frequencies is generally performed in software within the digital signal processors (63 and 69 of FIG. 1) using software amplitude pre-distortion. The software amplitude pre-distortion should compensate at least for one or more of the following effects including distortion introduced by the digital-to-analog converters in the transmit path of the base station wideband transceiver 50, narrowband ripple and filter roll-off distortion typically caused by narrowband surface acoustic wave (SAW) filters at intermediate frequencies (IF), and wideband ripple and filter roll-off distortion caused by wideband SAW filters at radio frequencies (RF) in both the receive and transmit paths found in the receiver 51 and the transmitter 57 (see FIG. 1).

This flattening of carrier frequencies or ARFCNs preferably normalizes all Broadband RF Transceivers (BRTs) to have one nominal output level for a given input level for each transmitted RF carrier. This flattening should have good accuracy at normal temperature levels. For example, the nominal output level can be equivalent to approximately +11 dBm when the input level is approximately −4 dBm, and the accuracy of this flattening can be equivalent to approximately plus or minus 0.25 dB.

Flattening of transmit and receive signal power in a BTS in accordance with the present invention can be performed preferably using two steps. First, flattening can be performed to account for Digital-to-Analog Converter (D/A) effects caused by Sin(X)/X rolloff by D/A 59 for example. Second, flattening can be performed to account for specific BRT RF frequency response. In the first step, to account for the effects of the D/A of a given BTS on transmit and receive power, flattening coefficients for the D/A can be stored in a memory location within the BRT. These flattening coefficients for D/A's are generic (based upon Sin(X)/X rolloff), and are universal across all BRTs within a BTS. These flattening coefficients may include 25 broadband converter modules (BCM) channel coefficients. In the second step, flattening is performed on the RF and IF carriers to account for both the wideband and narrowband distortion of the BRT RF filter response. First, flattening is performed to account for narrowband ripple and filter roll-off, among other types of distortion. Second, flattening is performed to account for wideband ripple and filter roll-off, among other types of distortion. The narrowband bandwidth will generally be a 5 MHz intermediate frequency bandwidth, whereas the wideband bandwidth is generally the full 60 MHz of radio frequency spectrum allocated to a cellular communications provider.

Figure 3:
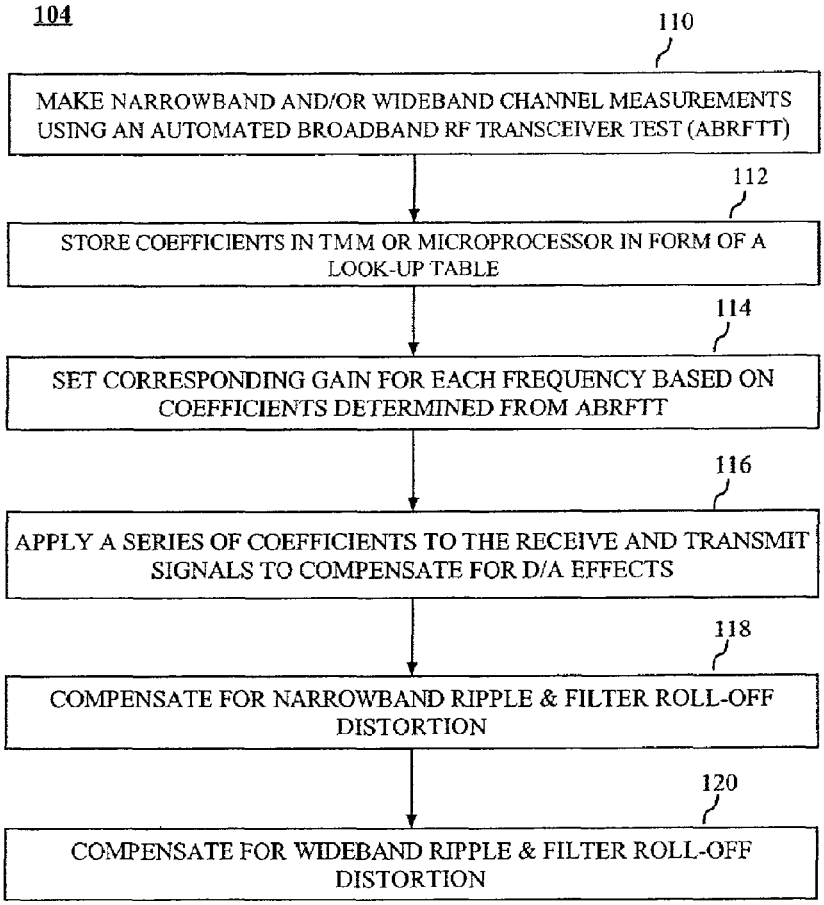
FIG. 3 is a flow chart illustrating the step of flattening in accordance with the present invention.

With reference to FIG. 3 in a specific embodiment of the present invention, the flattening step 104 could also comprise the step 110 of making narrowband channel measurements using an automated broadband radio frequency transceiver test to determine a set of coefficients for each narrowband channel and/or to determine a set of coefficients for the wideband channel (which can be performed by stepping through the channels in the wideband bandwidth). There are separate sets of coefficients for narrowband and wideband flattening to account for the separate types of distortion experienced caused by narrowband SAW filters at IF and wideband SAW filters at RF, respectively. Ideally, the automated broadband radio frequency transceiver test creates 25 narrowband coefficients and 300 wideband coefficients for a 60 MegaHertz bandwidth having 200 kHz channels. As shown in step 112, the coefficients can be optionally stored in a memory of a transceiver microprocessor module in each of the plurality of base station wideband transceivers or other suitable memory location within the transceiver. Preferably, the wideband coefficients and the narrowband coefficients are stored in a look-up table in memory, wherein each base station wideband transceiver will have its own set of wideband and narrowband coefficients. At step 114, a corresponding gain for each individual radio frequency is set based on the narrowband and wideband coefficients determined from the automated broadband radio transceiver test. Thus, in steps 116, 118, and 120, the coefficients are applied to each of the receive and transmit signals to compensate for the distortion effects resulting from digital-to-analog converters and/or from narrowband ripple and filter roll-off and/or wideband ripple and filter roll-off.

In a BTS in accordance with the present invention, an automated BRT Test System (BRTTS) can preferably collect BRT narrowband flatness data for a specific BRT, and will write that data to a pre-defined BRT storage location. This data will be gathered for each 5 MHz narrowband IF passband in a 60 MHz wideband RF bandwidth, i.e., measurements for the 5 MHz IF passband will be taken for the first through fifth RF frequencies in the wideband RF response, then measurements for the second 5 MHz IF passband will be taken for the second through sixth RF frequencies in the wideband RF response, etc., until all narrowband measurements have been made for the BRT. Of course, other techniques for gathering the narrowband data measurements and other bandwidths can be used as may be reasonably contemplated in the scope of the claims of the present invention. From these measurements, all 25 narrowband 200 kHz channels will have coefficients accounted for in this data. The pre-defined BRT storage location can be random access memory or flash memory preferably residing in the transceiver within a Transceiver Microprocessor Module (TMM) (90) or the DSPs 63 or 69 as previously described. Ideally, the TMM 90 is coupled between the receiver 51 and the transmitter 57 and can facilitate the ability to easily interchange transceivers among various base station transceivers within a communication system. In this manner, a transceiver can retain the data locally as it is moved within a system and can be further reprogrammed or flashed with new data as needed.

The automated BRTTS can also collect wideband flatness data for the entire allocated RF spectrum (60 MHz) of the specific BRT. This data is gathered for each possible channel tuning configuration for the 60 MHz. Measuring the coefficients for each possible channel tuning configuration preferably requires stepping through the entire 60 MHz wideband RF bandwidth from the lowest frequency values to the highest frequency value at 200 kHz increments. As with the narrowband measurements, other techniques for gathering the wideband data can be used as may be contemplated by the scope of the claims of the present invention. This data will identify the effect of placement within the 60 MHz radio frequency spectrum alone on the transmit and receive power of the BRT, and will preferably provide 300 individual tuning channel coefficients for the wideband response.

As previously described above, the collection of narrowband and wideband flatness data for the specific BRT that is measured accounts for the effects on the transmit and receive power levels of the BRT caused by at least one or more among the IF SAW filter, RF SAW filter, or other physical components in the BRT. Upon the determination of both of the narrowband and wideband flatness data (coefficients) by the BRTTS, the BRTTS can program the entire BRT's coefficient configuration segment into a table in the BRT's flash memory (generally resident in the TMM) or other comparable memory device. Thus, on the whole, this flash memory can store a BRT identifier, 25 narrowband channel coefficients, and 300 wideband tuning channel coefficients per signal path. All of this information can fit into one segment which can be identified as correlating to a specific BRT by using the BRT identifier. From the combination of these two sets of coefficients for the narrowband and wideband amplitude response, the proper gain can be set for each individual RF frequency passband starting at any point in the wideband frequency spectrum of a specific BRT.

Unlike with other existing broadband RF transceivers, gain is not added uniformly for all BRTs in the BTS of the present invention, i.e., the coefficient table is not comprised of solely narrowband coefficient averages for a cross-section of BRTs. Each individual BRT used in any BTS will have its own tailored BRT narrowband and wideband coefficient tables which will be unique to each BRT due to the myriad of variables in such systems. This will allow for an exact amount of gain to be added to the RF carriers received and transmitted by the BRT, and will allow for nominal output level specifications to be met and maintained with much greater accuracy than previously allowed.

As discussed above, each BRT used in a BTS can have a TMM with flash memory. This flash memory will store the narrowband and wideband RF coefficients for that respective BRT, allowing the BRT to be swapped between BTSs without the necessary re-testing of the new BTS to compensate for narrowband and wideband channel coefficients (because the coefficients for the BRT will travel within the BRT itself). These channel coefficients can then be downloaded by the BTS in which the BRT is installed for use in calculating the gain to be assigned to each transmit and receive channel in the BRT. Using transceiver specific values for both the narrowband and wideband effects on transmit and receive level, the BTS in accordance with the present invention has the ability to transmit and receive with a flatter amplitude response over frequency.

In the description above, it should be understood that wideband RF and narrowband IF coefficients must be independently collected for the transmitter path and each individual diversity receiver path. While particular embodiments of the present invention have been described, it should be understood that other embodiments could be interpreted as being within the scope of the invention.

We claim:

1. In a base station wideband transceiver capable of operating in a wireless cellular communications system that communicates with mobile subscribers, a method for equalization in transmit and receive levels, comprising [the steps of]:

assigning a plurality of transmit and receive carrier frequencies to the base station wideband transceiver;

flattening a spectral response of said base station transceiver across a range of frequencies including the plurality of transmit and receive carrier frequencies using [software] amplitude pre-distortion;

wherein the method further comprises [the step of] making narrowband IF channel measurements using an automated broadband radio frequency transceiver test (ABRFTT) to determine a set of coefficients for each narrowband IF channel;

wherein the ABRFTT [further] comprises [the step of] making wideband RF channel measurements that step through the wideband bandwidth to determine a set of coefficients for the wideband RF channel;

wherein the ABRFTT creates 25 narrowband coefficients for a 5 MHz IF bandwidth and 300 wideband coefficients for a 60 MHz RF bandwidth having 200 kHz channels.

[2. A method for equalizing a spectral response of a wireless cellular base station transceiver configurable for operating within any one of a plurality of relatively narrow segments of a wireless communications band, comprising the steps of:

storing a generic set of coefficients representative of amplitude distortions occurring as a result of signal conversions between analog and digital formats in said base station transceiver;

storing at least one set of transceiver specific coefficients representative of amplitude distortions associated with a specific broadband base station RF transceiver; and equalizing an amplitude response of said specific broadband base station RF transceiver at a plurality of transmit and receive carrier frequencies within a selected one of said segments using said generic set of coefficients and said transceiver specific coefficients to perform software amplitude pre-distortion.]

[3. The method according to claim 2 further comprising the step of selecting said at least one set of transceiver specific coefficients to include a first set of transceiver specific coefficients representative of amplitude distortions exclusive to narrowband processing within said specific broadband base station transceiver.]

[4. The method according to claim 3 further comprising the step of selecting said transceiver specific coefficients to further include at least a second set of transceiver specific coefficients representative of amplitude distortions associated with wideband signal processing within said specific broadband base station transceiver.]

[5. The method according to claim 4 further comprising the step of performing said software amplitude pre-distortion concurrently using said first and second sets of transceiver specific coefficients.]

[6. A broadband wireless cellular base station transceiver configurable for operating within any one of a plurality of relatively narrow segments of a wireless communications band, comprising;

a receiver comprising at least one device for converting between an analog and a digital format;

a memory device containing a generic set of coefficients representative of amplitude distortions occurring as a result of signal conversions between analog and digital formats in said base station transceiver;

a memory device containing at least one set of transceiver specific coefficients representative of amplitude distortions associated with said specific base station RF transceiver; and at least one digital signal processor programmed to equalize an amplitude response of said specific broadband base station RF transceiver at a plurality of transmit and receive carrier frequencies within a selected one of said segments using said generic set of coefficients and said transceiver specific coefficients to perform software amplitude pre-distortion.]

[7. The broadband wireless cellular base station transceiver according to claim 6 wherein said at least one set of transceiver specific coefficients includes a first set of transceiver specific coefficients representative of amplitude distortions exclusive to narrowband processing within said specific broadband base station RF transceiver.]

[8. The broadband wireless cellular base station transceiver according to claim 7 wherein said transceiver specific coefficients further include at least a second set of transceiver specific coefficients representative of amplitude distortions associated with wideband signal processing within said specific broadband base station RF transceiver.]

[9. The broadband wireless cellular base station transceiver according to claim 8 wherein said digital signal processor concurrently uses said first and second sets of transceiver specific coefficients to perform said software amplitude pre-distortion.]

*10. A base station wideband transceiver capable of operating in a wireless cellular communications system that communicates with mobile subscribers, comprising:*

*a receiver section that is assigned a plurality of transmit and receive carrier frequencies;*

*a transmitter section configured to flatten a spectral response of said base station transceiver across a range of frequencies including the plurality of transmit and receive carrier frequencies using amplitude pre-distortion;*

*wherein the transmitter section is further configured to make narrowband IF channel measurements using an automated broadband radio frequency transceiver test (ABRFTT) to determine a set of coefficients for each narrowband IF channel;*

*wherein the ABRFTT is configured to make wideband RF channel measurements that step through the wideband bandwidth to determine a set of coefficients for the wideband RF channel;*

*wherein the ABRFTT is further configured to create 25 narrowband coefficients for a 5 MHz IF bandwidth and 300 wideband coefficients for a 60 MHz RF bandwidth having 200 kHz channels.*

*11. In a base station wideband transceiver capable of operating in a wireless cellular communications system that communicates with mobile subscribers, a method for equalization in transmit and receive levels, comprising:*

*assigning a plurality of transmit and receive carrier frequencies to the base station wideband transceiver;*

*flattening a spectral response of said base station transceiver across a range of frequencies including the plurality of transmit and receive carrier frequencies using amplitude pre-distortion,*

*wherein the method further comprises making narrowband IF channel measurements using an automated broadband radio frequency transceiver test (ABRFTT) to determine a set of coefficients for each narrowband IF channel,*

*wherein the ABRFTT comprises making wideband RF channel measurements that step through the wideband bandwidth to determine a set of coefficients for the wideband RF channel that is different in number from the set of coefficients for each narrowband IF channel, and*

*determining a gain to be assigned to each transmit channel and each receive channel of the base station wideband transceiver to achieve equalization in transmit and receiving power levels using the set of coefficients for each narrowband IF channel and the set of coefficients for the wideband RF channel in combination.*

*12. A base station wideband transceiver capable of operating in a wireless cellular communications system that communicates with mobile subscribers, comprising:*

*a receiver section that is assigned a plurality of transmit and receive carrier frequencies;*

*a transmitter section configured to flatten a spectral response of said base station transceiver across a range of frequencies including the plurality of transmit and receive carrier frequencies using amplitude pre-distortion;*

*wherein the transmitter section is further configured to make narrowband IF channel measurements using an automated broadband radio frequency transceiver test (ABRFTT) to determine a set of coefficients for each narrowband IF channel;*

*wherein the ABRFTT is configured to make wideband RF channel measurements that step through the wideband bandwidth to determine a set of coefficients for the wideband RF channel that is different in number from the set of coefficients for each narrowband IF channel;*

*wherein the transmitter section is configured to use the set of coefficients for each narrowband IF channel and the set of coefficients for the wideband RF channel in combination to determine a gain to be assigned to each transmit channel and each receive channel of the base station wideband transceiver to achieve equalization in transmit and receive power levels.*

*13. A wireless communications system accessible by multiple wireless communicators, comprising:*

*a plurality of base station wideband transceivers capable of operating in a wireless communications system accessible by mobile communicators, each of the plurality of base station wideband transceivers comprising:*

*a receiver section that is assigned a plurality of transmit and receive carrier frequencies; and*

*a transmitter section configured to flatten a spectral response of the base station wideband transceiver across a range of frequencies including the plurality of transmit and receive carrier frequencies using amplitude pre-distortion;*

*wherein the transmitter section is further configured to make narrowband IF channel measurements using an automated broadband radio frequency transceiver test (ABRFTT) to determine a set of coefficients for each narrowband IF channel;*

*wherein the ABRFTT is configured to make wideband RF channel measurements that step through the wideband bandwidth to determine a set of coefficients for the wideband RF channel; and*

*wherein the ABRFTT is further configured to create 25 narrowband coefficients for a 5 MHz IF bandwidth and 300 wideband coefficients for a 60 MHz RF bandwidth*

*having 200 kHz channels and stores the narrowband and wideband coefficients in a memory device.*

*14. The method according to claim 11, wherein the ABRFTT further comprises creating 25 narrowband coefficients for a 5 MHz IF bandwidth and 300 wideband coefficients for a 60 MHz RF bandwidth having 200 kHz channels.*

*15. The base station wideband transceiver according to claim 12, wherein the ABRFTT is further configured to create 25 narrowband coefficients for a 5 MHz IF bandwidth and 300 wideband coefficients for a 60 MHz RF bandwidth having 200 kHz channels.*

*16. The method according to claim 1, further comprising storing the set of coefficients for each narrowband IF channel and the set of coefficients for the wideband RF channel in a storage within the base station wideband transceiver.*

*17. The base station wideband transceiver according to claim 10, further comprising a storage coupled between the receiver section and the transmitter section and configured to store the set of coefficients for each narrowband IF channel and the set of coefficients for the wideband RF channel.*

* * * * *